(12) United States Patent
Roethel

(10) Patent No.: US 6,779,556 B2
(45) Date of Patent: Aug. 24, 2004

(54) HALF-TUBE SEAL ADAPTER COUPLING FOR BEVERAGE SYSTEMS

(75) Inventor: Henry G. Roethel, Ravenna, OH (US)

(73) Assignee: The Meyer Company, Cleveland, OH (US)

(*) Notice: Subject to any disclaimer, the term of this patent is extended or adjusted under 35 U.S.C. 154(b) by 261 days.

(21) Appl. No.: 10/114,690

(22) Filed: Apr. 2, 2002

(65) Prior Publication Data

US 2002/0139423 A1 Oct. 3, 2002

Related U.S. Application Data

(60) Provisional application No. 60/281,095, filed on Apr. 3, 2001.

(51) Int. Cl.[7] ................................................ F16L 29/00
(52) U.S. Cl. .............................. 137/614.03; 251/149.6
(58) Field of Search ......................... 137/614.03, 614; 251/149.1, 149.6

(56) References Cited

U.S. PATENT DOCUMENTS

| | | |
|---|---|---|
| 2,505,093 A | 4/1950 | Brock |
| 3,416,567 A | 12/1968 | Von Dardel et al. |
| 3,550,626 A | 12/1970 | Daniels et al. |
| 3,994,324 A | 11/1976 | Zeyra |
| 4,146,018 A | 3/1979 | Aldridge et al. |
| 4,421,146 A | 12/1983 | Bond et al. |
| 4,445,551 A | 5/1984 | Bond et al. |
| 4,564,132 A | 1/1986 | Lloyd-Davies |
| RE32,354 E | 2/1987 | Savage |
| 4,770,391 A | 9/1988 | Sagger |
| 4,948,014 A | 8/1990 | Rutter et al. |
| 5,031,662 A | 7/1991 | Roethel |
| 5,255,713 A * | 10/1993 | Scholle et al. ......... 137/614.04 |
| 5,477,883 A * | 12/1995 | Totten .................... 137/614.03 |
| 5,775,671 A * | 7/1998 | Cote, Sr. ................. 251/149.1 |
| 6,138,878 A | 10/2000 | Savage et al. |
| 6,347,785 B1 * | 2/2002 | Copp et al. .............. 251/149.6 |

* cited by examiner

Primary Examiner—Kevin Lee
(74) Attorney, Agent, or Firm—Fay, Sharpe, Fagan, Minnich & McKee, LLP

(57) ABSTRACT

A valved outlet for connection to a fluid spout on a fluid container includes at least a first component that includes a body defining a first flow passage extending therethrough. The body has an inlet end adapted for insertion into an associated spout and an outlet end for discharging fluid that enters the first flow passage from the inlet end. A valve portion is located at the inlet end and controls fluid flow from the spout into the first flow passage. The valve includes a housing that defines a second flow passage that communicates with the first flow passage through a port. A resilient seal member has first and second legs compressibly located in the second flow passage and resilient sealingly engaged with the port. The first and second legs are in abutment with the housing of the valve portion. A slide is mounted for axial movement between first and second operative positions in the first flow passage. The slide has an actuating portion that is extendable through the port into engagement with the seal member to move the seal member away from the port when the slide is moved from the first operative position to the second operative position. The valved outlet can also include a second component including a housing adpated for releasably coupling to the body of the first component. The housing of the second component defines a third flow passage that communicates with the first flow passage. The housing of the second component includes a member that contacts and moves the slide member to the second operative position.

14 Claims, 5 Drawing Sheets

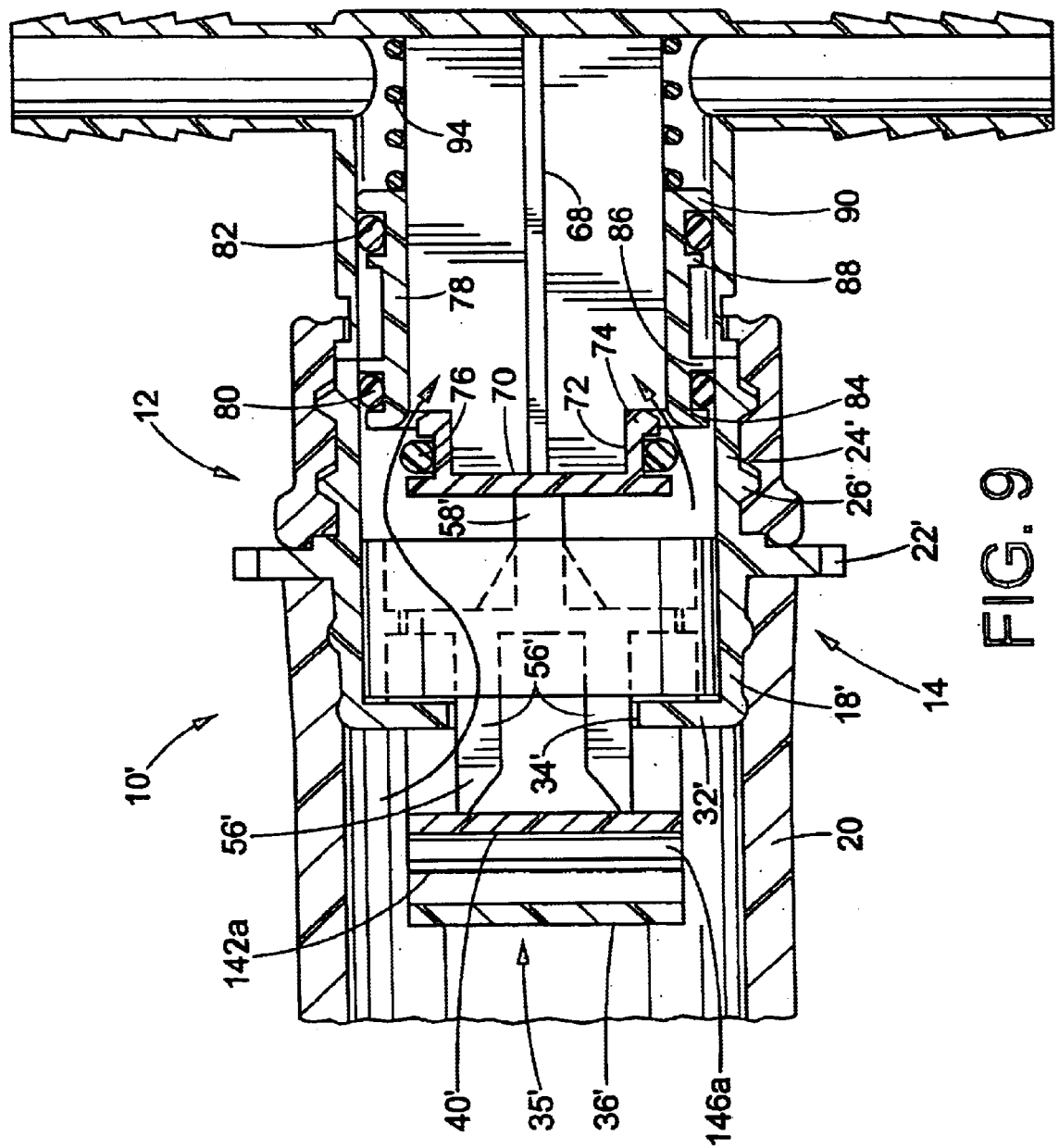

HALF-TUBE SEAL ADAPTER COUPLING FOR BEVERAGE SYSTEMS

CROSS-REFERENCE TO RELATED APPLICATION

This application claims priority from and hereby expressly incorporates by reference U.S. provisional application No. 60/281,095 filed Apr. 3, 2001.

BACKGROUND OF THE INVENTION

The subject invention is directed toward the art of quick connect/disconnect couplings for use in beverage dispensing systems. The coupling of the invention is particularly intended for use in connecting flexible beverage bags to associated service systems and will be described with reference thereto; however, as will become apparent, the invention could be used in other environments and for other purposes.

Beverage dispensing systems which use flexible bags for storage of the beverage are well known and in widespread use. In these systems, it is necessary that the storage bags be connected and disconnected quickly and efficiently. In addition, the connecting and disconnecting must preferably be accomplished without wasting beverage liquid through leakage, uncontrolled opening of the connection components and the like.

In addition to the above, it is highly desirable that the coupling components be simple and inexpensive in design and capable of connecting with a minimum of force application.

One suitable prior art coupling is disclosed in U.S. Pat. No. 5,031,662. This prior coupling is has enjoyed widespread commercial success. It has been deemed desirable to develop and alternative to the coupling disclosed in U.S. Pat. No. 5,031,662 in an effort to reduce manufacturing costs without loss of performance or durability.

SUMMARY OF THE INVENTION

In accordance with the present development, a valved outlet comprises a first component having a body with a first flow passage extending therethrough. The body has an inlet end adapted for connection to an associated spout of an associated container. The first component further comprising a seal-retaining body defining a second flow passage that fluidically communicates with the first flow passage through a port. A partially cylindrical seal member positioned in said second flow passage and compressibly resiliently biased into sealing engagement with the port. A slide member is slidably mounted in the first flow passage and is movable therein between first and second operative positions. The slide member deflects the seal member away from and out of sealing engagement with the port when the slide member is moved to its second operative position. A second component comprises a housing including a third flow passage and a fluid outlet in communication with the third flow passage. The second component is adapted for operative coupling with the first component whereby the first and third flow passages are in fluid communication. The second component engages and moves the slide member from the first operative position to the second operative position when the second component is operatively coupled to the first component.

In accordance with another aspect of the invention, a valved outlet for connection to a fluid spout on a fluid container comprises a first component that includes a body defining a first flow passage extending therethrough. The body has an inlet adapted for insertion into an associated spout, and includes an outlet end for discharging fluid that enters the first flow passage from the inlet end. A valve portion is located at the inlet end for controlling fluid flow from the spout into the first flow passage. The valve comprises a housing that defines a second flow passage that communicates with the first flow passage through a port. A resilient seal member has first and second legs that are compressibly located in the second flow passage and that is resilient sealingly engaged with the port. First and second legs of the resilient seal are in abutment with the housing of the valve portion. A slide is mounted for axial movement between first and second operative positions in the first flow passage. The slide has an actuating portion that is extendable through the port into engagement with the seal member to move said seal member away from the port when the slide is moved from its first operative position to its second operative position.

BRIEF DESCRIPTION OF THE DRAWINGS

The invention comprises various components and arrangements of components, preferred embodiments of which are illustrated in the accompanying drawings that form a part hereof and wherein:

FIG. 9 shows an adapter coupling formed in accordance with the present invention and including the first component illustrated in FIG. 7.

DETAILED DESCRIPTION OF PREFERRED EMBODIMENTS

Figure 1:
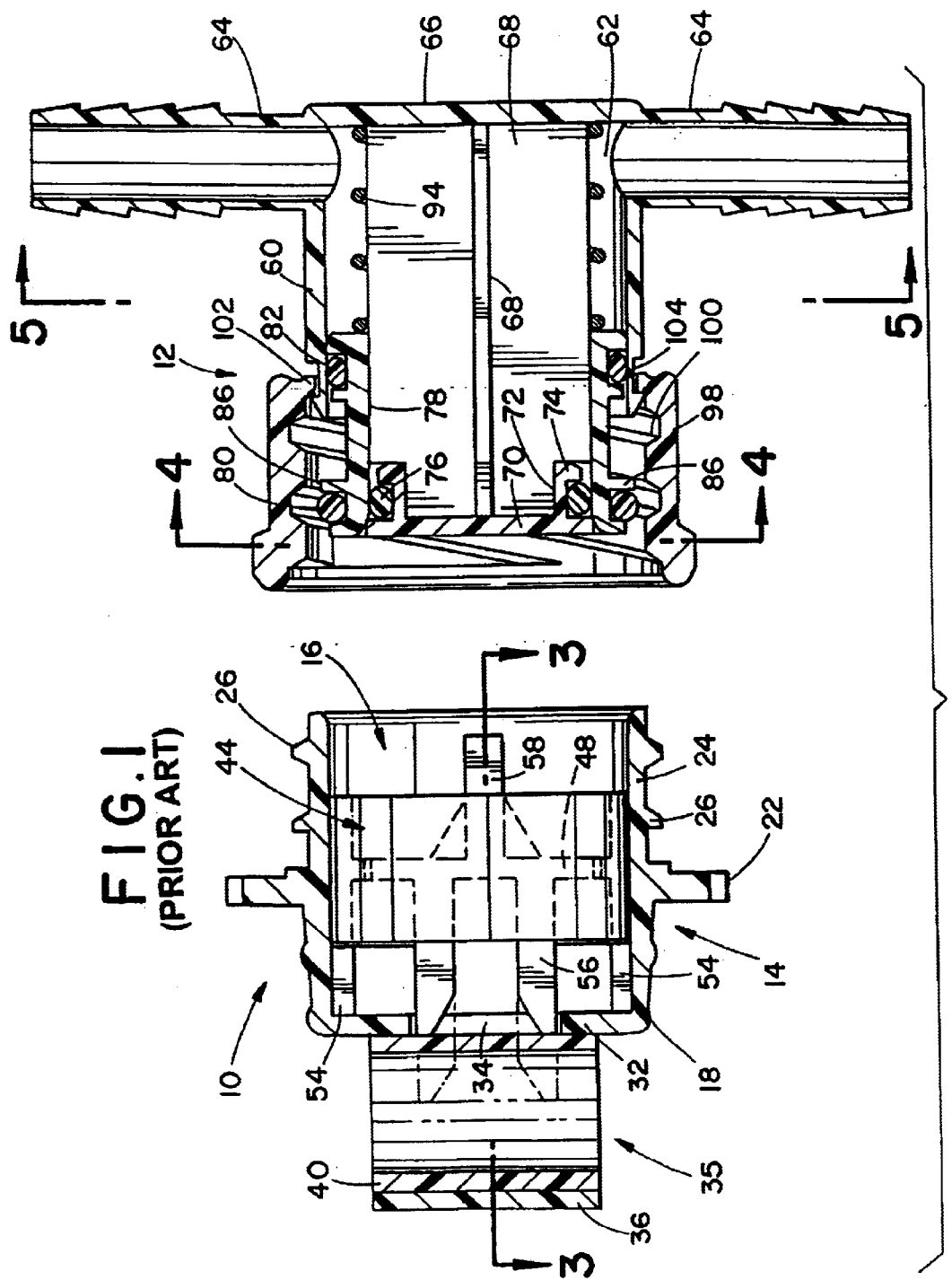
FIG. 1 is a longitudinal cross-sectional view of prior art coupling components in aligned but uncoupled and closed positions.
Figure 2:
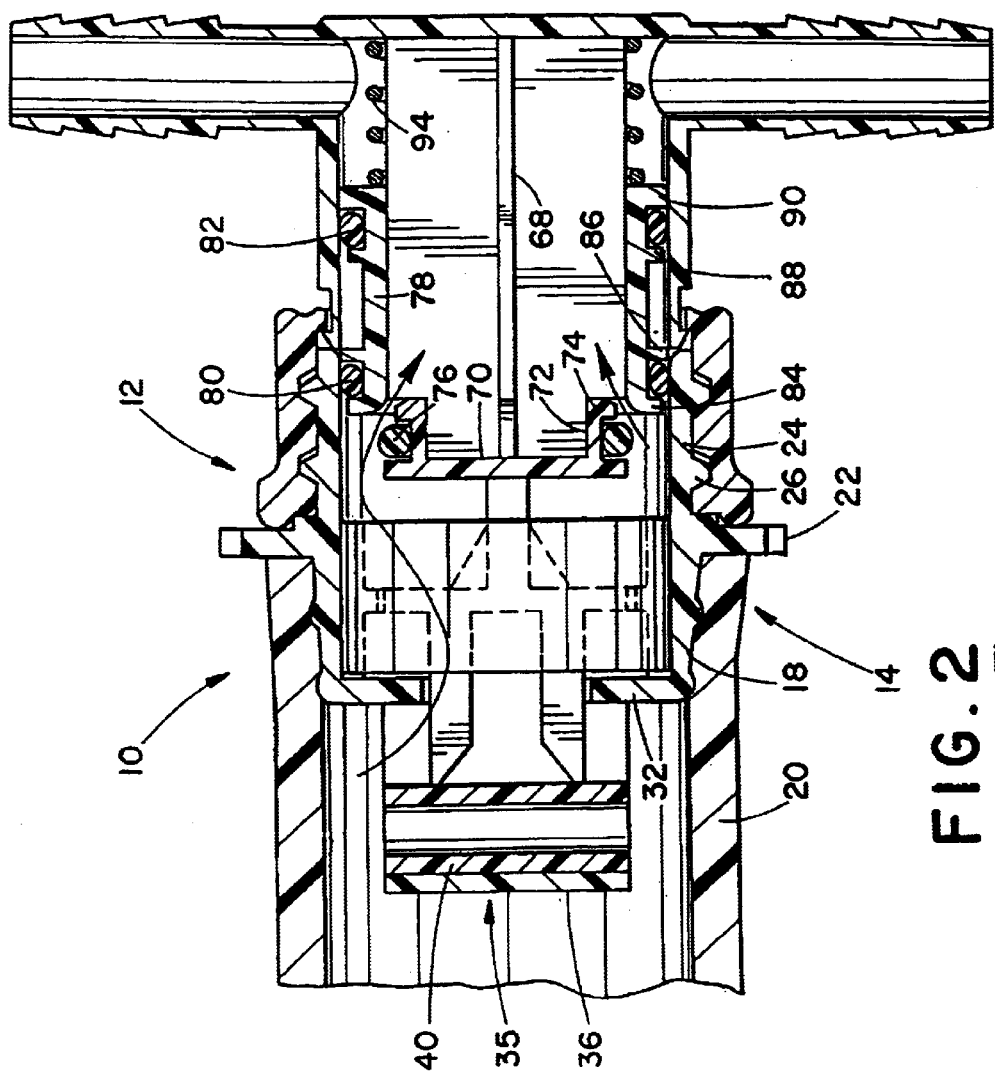
FIG. 2 is a view similar to FIG. 1 but showing the prior art components in a coupled position with their internal valves in the open position.

Referring more particularly to the drawings wherein the showings are for the purpose of illustrating a preferred embodiments of the invention only, and not for the purpose of limiting same, FIGS. 1 and 2 show the overall arrangement of a prior coupling assembly and comprising a first coupling component 10 adapted to join with and provide a mechanical and flow connection with a second coupling component 12. Each of the coupling components 10 and 12 are preferably injection molded from a suitable plastic to provide a relatively inexpensive coupling structure.

Figure 3:
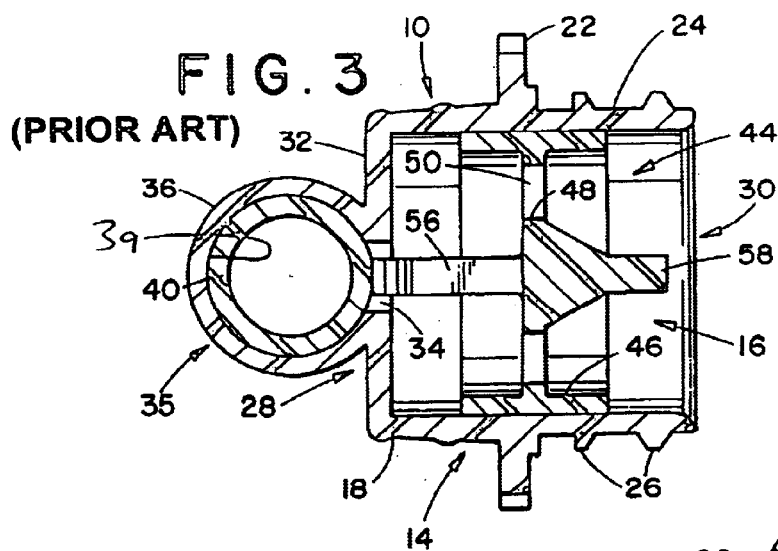
FIGS. 3 through 5 are cross-sectional views taken on lines 3—3, 4—4, and 5—5, respectively, of FIG. 1.

The prior first coupling component 10 can best be understood by reference to FIGS. 1 through 3 wherein it is shown as having a main cylindrical body portion 14 which defines a first or central flow passage 16 that extends axially through the body. A first cylindrical end portion 18 is sized so as to be capable of being closely and sealingly received within the outlet spout 20 of a conventional beverage storage bag as shown in FIG. 2. The body 14 further includes a radially extending flange portion 22 which limits the insertion of the body into the spout 20. Additionally, the cylindrical right-hand our outer end 24 of body 14 is provided with suitable external threads 26 which, as will subsequently be described, provide means for connecting the second coupling component 12 thereto.

The passageway 16 has an inlet end 28 and an outlet end 30 as referenced in FIG. 3. The inlet end 28 includes a wall portion 32 which extends radially inward and terminates in a vertically elongated elliptical inlet opening 34.

Associated with the inlet end 28 of the body 14 is a valve assembly 35. The valve assembly 35 comprises a tubular seal retaining member or body 36 which is integrally molded to the end wall 32 and which extends with its center axis perpendicular to the center axis of body 14. As illustrated, the tubular body 36 is preferably of cylindrical shape and defines a second flow passage 39. The tubular body 36 is open at its opposite ends as illustrated so the second flow passage 39 receives fluid flow from an associated spout of an associated container. As can be seen from FIGS. 2 and 3, the second flow passage 39 of the tubular member 36 communicates with the first flow passage 16 of body 14 through the inlet opening or port 34.

In order to provide a valving control of the opening 34 in this prior arrangement, there is a resilient tubular valve or seal member 40, operably positioned within the second flow passage 39 of the tubular member 36. The resilient tubular seal member 40 is formed of food-grade rubber or similar resilient elastomeric material, e.g., silicone, and is located in the tubular member 36 under substantial compressive force (owing to its dimensions and natural resiliency) so as to sealingly overlie and close off the inlet opening 34. While the seal member 40 is positioned as illustrated in FIGS. 1 and 3, the opening 34 is closed and flow cannot take place between the interior of the beverage bag nozzle and the first (central) flow passage 16. However, when the seal member 40 is deflected away from the inlet 34 as illustrated in FIGS. 2 and 3, flow can pass from the interior of the beverage bag to the flow passage 16 by way of the second flow passage 39 and inlet port 34.

Figure 6:
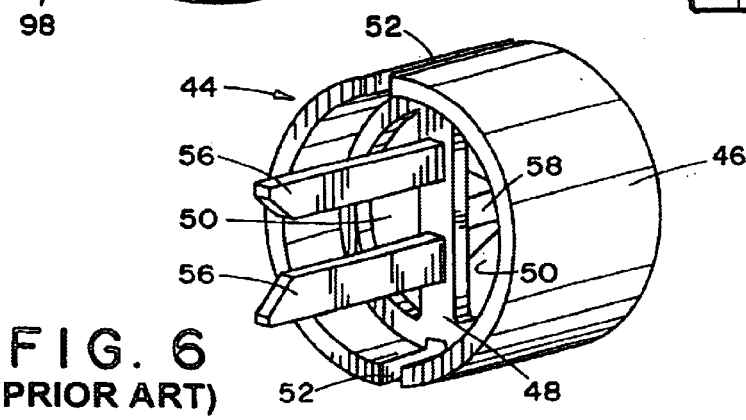
FIG. 6 is a pictorial view of an operating slide member.

The means for selectively deflecting the tubular seal member 40 away from port opening 34 comprises a slide member 44 which is located within the first flow passage 16 and mounted for selective sliding movement therein between first and second operative positions. The actual preferred shape and configuration of the slide member 44 is best illustrated in FIG. 6. As shown therein, it comprises a central sleeve-like body 46 which has an outer diameter so as to be closely but slidably received within the interior of first passage 16. Located in the axial center of the sleeve 46 is a transversely extending wall 48 which includes a pair of spaced elongated openings 50 formed therethrough. The sleeve 46 is arranged so as to be guided within the first passageway 16 by a pair of inwardly extending diametrically opposed slots 52 which are sized to receive suitable guide ribs 54 (see FIG. 1) which extend inwardly from the interior of passageway 16. These ribs 54 and their cooperation with the slots 52 allow free axial sliding movement of member 46 while preventing unwanted rotary movement.

Extending from the left or inner side of the central wall 48 are a pair of fingers 56 which are sized and spaced so as to pass freely through the inlet port opening 34. Extending from the opposite side of the wall 48 is an operating stem or member 58. The operating member 58 provides means for causing the slide member to move from the first operative position illustrated in solid lines in FIG. 1 to a second operative position as illustrated in phantom lines in FIG. 1 that produces deformation and opening of the valve tube 40 when the components are in the coupled position of FIG. 2 as described in further detail below.

Figure 5:
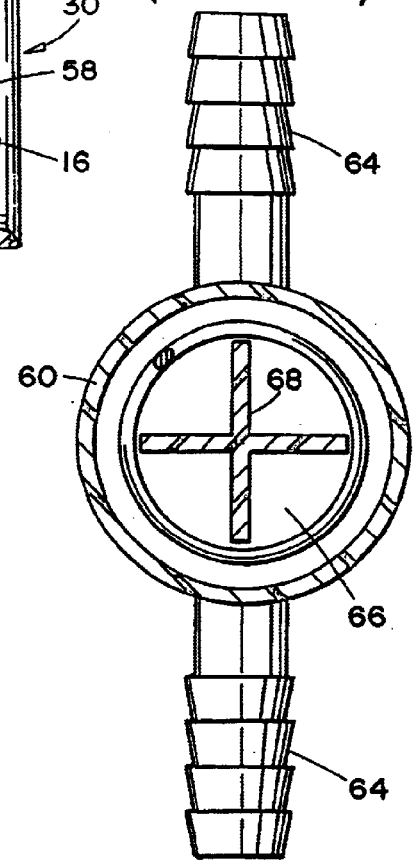
Figure 4:
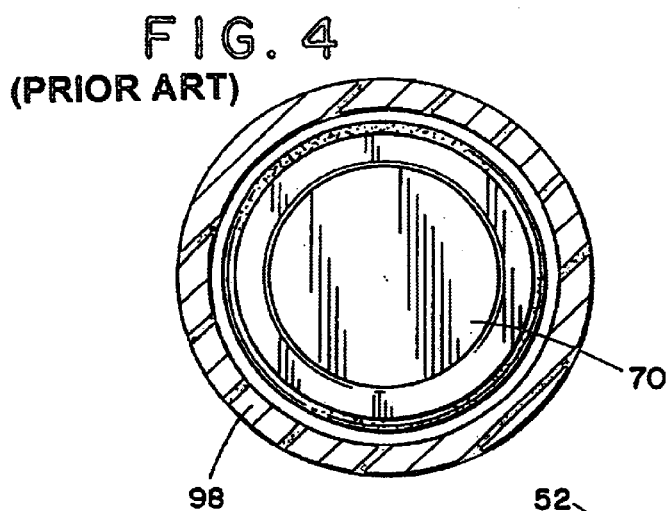

The actual operation and interrelation between the two components 10 and 12 in this prior arrangement will become better understood with a full appreciation of the construction and arrangement of component 12. As best seen in FIGS. 1, 4, and 5, the coupling component 12 generally comprises a main cylindrical body 60 having a third flow passage 62 which, in the illustrated embodiment, is defined by a cylindrical interior chamber. The coupling component also comprises a fluid outlet such as one or more outlet tubes 64 that are in fluid communication with the third flow passage 62. The outlet tubes 64 provide means for fluidic connection of the coupling component 12 to associated beverage dispensing lines connected with suitable dispensing taps, outlet nozzles, or the like. In the subject embodiment, the outlet tubes 64 are illustrated as arranged for connection with conventional hose lines through the use of standard barb exteriors. Of course, other types of outlet connections could be provided on the tubes 64. Moreover, the coupling component 12 could be provided with one or any number of such outlet tubes 64.

Formed integrally with the cylindrical body 60 and extending laterally from the end wall 66 is a central support member 68 which, as best seen in FIG. 5, has an X-shaped cross-inwardly section. Additionally, the support member 68 is axially located within the third flow passage 62 and extends to the left (as viewed in FIG. 1) out of the body 60.

At the left-hand or inner end (as viewed in FIGS. 1 and 2) of the central support member 68, there is permanently affixed thereto a liquid impervious disk member 70 having a circular configuration and an axially extending sleeve portion 72 which terminates in a radially outwardly extending flange 74. A suitable O-ring member 76 is positioned in the radially outwardly extending groove defined by the peripheral portion of disk 70 and the flange 74.

Carried on the support member 68 for axial sliding movement thereon is a valve sleeve member 78 which has a cylindrical configuration and an inner diameter which is closely but slidably received on the outer ends of the X-shaped cross-section of the support member 68. O-rings 80, 82 are carried at the opposite ends of the sleeve as shown. The O-rings are maintained in their desired position by spaced sets of radially extending flanges 84 and 86 and 88, 90. The flanges 88, 90 have an outer diameter which is only slightly less than the inner diameter of the chamber 62. Flange 86, however, extends radially outward a distance slightly greater than the interior diameter of third flow passage 62 and, for reasons which will subsequently be described, is slightly larger in diameter than the interior diameter of first flow passageway 16 defined in coupling component 10.

As can be seen from FIGS. 1 and 2, a spring member 94 is arranged to maintain the sleeve member biased inwardly or to the left, i.e., toward the disk member 70. The maximum outward movement of the sleeve member 78 toward the disk member 70 is limited by engagement between the outer radial periphery of disk member 70 and the end of sleeve 78 as illustrated in FIG. 1.

When sleeve 78 is in the FIG. 1 position, a seal is present between the disk member 70 and the interior of the sleeve 78 by virtue of the O-ring 76. Additionally, the O-ring 82 is sealed with the interior of the cylindrical body 60. In this position, as illustrated in FIG. 1, flow cannot enter the third flow passage 62. Only when the components 10 and 12 are properly engaged and interrelated, however, is the sleeve valve 78 is moved to the right against the bias of spring 94 out of its normally closed condition so that flow can take place about the disk member 70 from the first passage 16 into the third passage 62 as shown by the arrow A1 in FIG. 2. Coupling engagement and joining of the components 10, 12 can be provided by any suitable means such as a friction fit, snap-fit, threaded connection, adhesive connection or the like. In the illustrated example, coupling of the components 10, 12 is provided by a cylindrical female nut member 98 which is suitably received about the exterior of the body 60. As illustrated, the nut member 98 is internally threaded as shown at 100 and sized so as to mate with the external threads 26 on the end 24 of first component 10. A radially inward extending flange portion 102 is fitted within a groove 104 on body 60. This relationship retains the nut member on the body 60 while allowing it to be rotatable relative thereto.

To join the coupling components 10 and 12, they are moved to the aligned position shown in FIG. 1 and then brought axially together and the nut member 98 tightened onto the threaded exterior 26 of member 10. As the tightening takes place, the disk member 70 engages the end of operating stem 58 and causes the slide member 44 to be moved inwardly or to the left (toward the seal member 40) from its first operative position to its second operative position with the fingers 56 entering through the port 44 and deflecting the seal member 40 to the left to the dotted line position shown in FIGS. 1 and 3. Simultaneously with this movement, the right-hand end of the component 10 engages with the O-ring 80 and the flange 86. This creates a seal between the exterior of sleeve 78 and the interior of coupling 10 portion 24. It also causes the sleeve 78 to be slid to the right against the bias of spring 94 to open the flow passage about disk 70. This final connected relationship is shown in FIG. 2.

Figure 7:
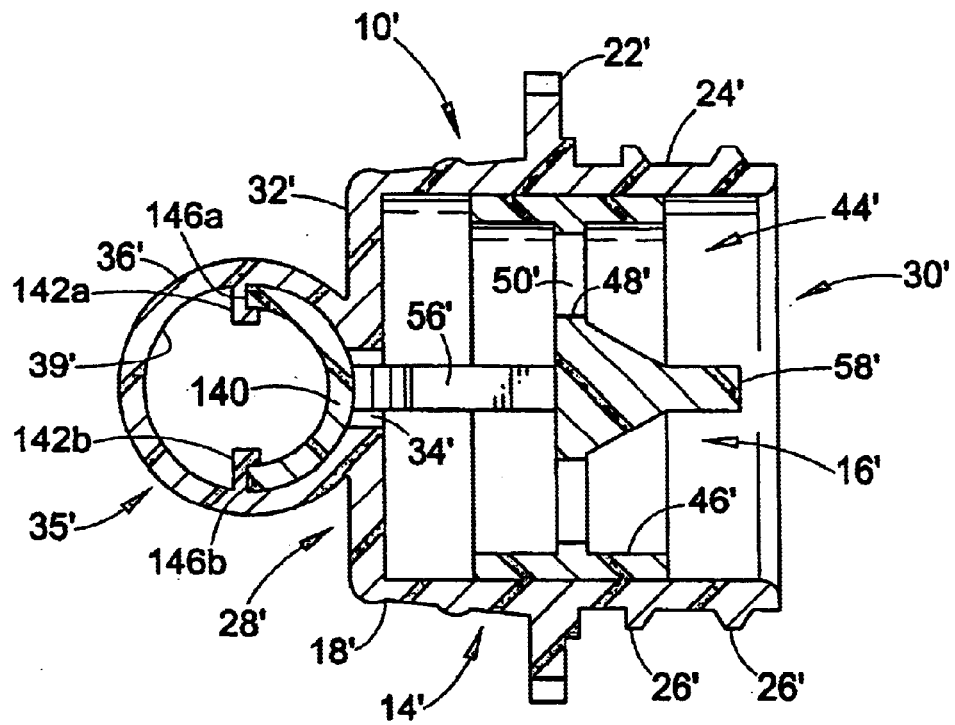
FIG. 7 illustrates a first component of an adapter coupling formed in accordance with the present invention.
Figure 8:
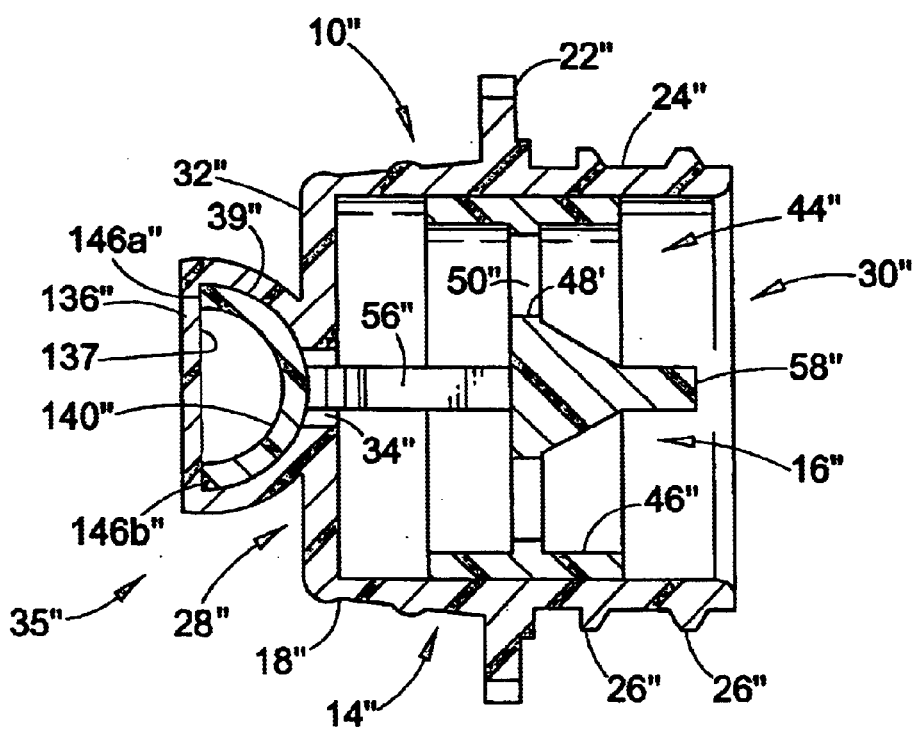
FIG. 8 is a view similar to FIG. 7 but showing still another alternative embodiment of a first component of an adapter coupling.

A coupling formed in accordance with the present invention comprises the second component 12 as described above and a newly designed first component 10' as described below and as illustrated in FIG. 7 or 8. A first coupling component formed in accordance with the present development is illustrated at 10' in FIG. 7. Except as shown and described, the first coupling component 10' is identical to the first coupling component 10 and, thus, like reference numerals including a prime (') suffix are employed to identify like components. New components are identified with new reference numerals.

In place of the tubular seal 40, the component 10' comprises a partially tubular or arcuate seal member 140 that is otherwise identical to the seal 40. In its preferred conformation, the seal member 140 is partially tubular, e.g., semi-tubular or half-tubular as illustrated. The tubular portion 36' in which the seal member 140 is received defines the third flow passage 39' and first and second radially inwardly projecting shoulders 142a, 142b that are adapted to receive and retain respective first and second legs or terminal ends or feet 146a, 146b of the seal member 140. The shoulders 142a, 142b and seal 140, itself, are dimensioned so that the seal 140 is compressed when operably positioned in the tubular member 36' as shown so that it sealingly engages the inlet opening 34' with sufficient compressive force to prevent leakage. The seal member 140 utilizes significantly less material than the seal 40. Thus, the seal 140 is less expensive and its use results in lower cost of the component 10' relative to the component 10.

Those of ordinary skill in the art will recognize that the member 36' need not be tubular and can have a different cross-sectional shape as desired as long as the seal member 140 can be accommodated properly so that it sealingly engages the inlet opening 34' as described. FIG. 8 illustrates a first coupling component 10" formed in accordance with a second embodiment of the present invention. Except as otherwise shown and/or described, the coupling 10" is identical to the coupling 10'. Therefore, like components of the coupling 10" relative to the coupling 10' are identified with like reference numerals including a double-primed (") suffix.

As shown in FIG. 8, the first component 10" includes a semi-cylindrical valve housing member 136" in which the arcuate seal 140" is operably positioned. The valve housing member defines the third flow passage 39" in which the seal 140" is positioned. The legs or terminal ends 146a, 146b of the seal are seated against a transverse end wall 137 of the housing member 136".

FIG. 9 shows a coupling formed in accordance with the present invention including the first component 10' coupled to the known second component 12. Those of ordinary skill in the art will recognize that a coupling formed in accordance with the present invention comprises either the first valve component 10' or the first valve component 10" coupled to the second valve component 12.

The invention has been described with reference to the preferred embodiment. Obviously, modifications and alterations will occur to others upon a reading and understanding of this specification. It is intended that the invention be construed as including all such modifications and alterations.

Having thus described the preferred embodiments, what is claimed is:

1. A valved outlet comprising:
   a first component having a body with a first flow passage extending therethrough, said body having an inlet end adpated for connection to an associated spout of an associated container, said first component further comprising a seal-retaining body defining a second flow passage that fluidically communicates with said first flow passage through a port;
   a partially cylindrical seal member positioned in said second flow passage and compressibly resiliently biased into sealing engagement with said port;
   a slide member slidably mounted in said first flow passage and movable in said first flow passage between first and second operative positions, said slide member deflecting said seal member away from and out of sealing engagement with said port when moved to said second operative position;
   a second component comprising a housing including a third flow passage and a fluid outlet in communication with said third flow passage, said second component adapted for operative coupling with said first component whereby said first and third flow passages are in fluid communication, said second component engaging and moving said slide member from said first operative position to said second operative position when said second component is operatively coupled to said first component.

2. The valved outlet as set forth in claim 1, wherein said seal retaining body defines first and second shoulders in said second flow passage and wherein said partially cylindrical seal member defines first and second terminal ends that are engaged respectively with said first and second shoulders.

3. The valved outlet as set forth in claim 2, wherein said seal retaining body is tubular and said second flow passage is cylindrical.

4. The valved outlet as set forth in claim 1, wherein said seal retaining body defines said second flow passage to have a semi-cylindrical cross-section and wherein said partially cylindrical seal member is semi-cylindrical.

5. The valved outlet as set forth in claim 1, further comprising means for releasably connecting said second component to said first component.

6. The valved outlet as set forth in claim 5, wherein said connecting means comprises threads defined on said first component and a nut rotatably supported on said second component, said nut adapted for mating with said threads of said first component.

7. The valved outlet as set forth in claim 1, further comprising a normally closed valve assembly housed within said second component for undesired fluid communication into said third fluid flow passage, said normally closed valve assembly urged open upon operative coupling of said second component to said first component.

8. The valved outlet as set forth in claim 7, wherein said normally closed valve assembly comprises:

a fixed support located in said third flow passage;

a sleeve member slidably positioned on said fixed support member and sealingly engaged with an inner wall of said second component that defines said third flow passage and with a fluid-impervious disk portion of said fixed support; and, a biasing spring that urges said sleeve member into sealing engagement with said fluid-impervious disk portion of said fixed support, said sleeve selectively movable against said biasing spring out of sealing engagement with said fluid-impervious disk portion to allow flow into said third flow passage between said sleeve and said disk.

9. The valved outlet as set forth in claim 8, wherein said fluid-impervious contacts and moves said slide member of said first component to said second operative position when said second component is coupled to said first component.

10. A valved outlet for connection to a fluid spout on a fluid container, said valved outlet comprising a first component that comprises:

a body defining a first flow passage extending therethrough, said body having an inlet end for insertion into an associated spout and an outlet end for discharging fluid that enters said first flow passage from said inlet end;

a valve portion located at the inlet end for controlling fluid flow from the spout into the first flow passage, said valve comprising a housing that defines a second flow passage that communicates with the first flow passage through a port;

a resilient seal member having first and second legs compressibly located in said second flow passage and resilient sealingly engaged with said port, said first and second legs in abutment with said housing of said valve portion;

a slide mounted for axial movement between first and second operative positions in said first flow passage, said slide having an actuating portion that is extendable through said port into engagement with said seal member to move said seal member away from said port when said slide is moved from said first operative position to said second operative position.

11. The valved outlet as set forth in claim 10, further comprising a second component comprising:

a housing adpated for releasably coupling to said body of said first component, said housing defining a third flow passage for communicating with said first flow passage when said housing of said second component is operably coupled to said body of said first component, said housing of said second component further comprising a member for contacting said slide member and moving said slide member to said second operative position when said housing of said second component is operably coupled to said body of said first component.

12. The valved outlet as set forth in claim 11, wherein said housing of said second component further comprises a fluid outlet that communicates with said third flow passage.

13. The valved outlet as set forth in claim 11, further comprising:

a normally-closed valve for controlling fluid flow from said first flow passage into said third flow passage, said normally-closed valve engageable and moved to an opened position by said body of said first component when said housing of said second component is operably coupled to said body of said first component.

14. The valved outlet as set forth in claim 13, wherein said normally-closed valve comprises:

a fixed support located in said third flow passage; and, a sleeve slidably mounted on said fixed support and sealingly engaged with said housing; and, a spring for biasing said sleeve into sealing engagement with a disk member connected to said fixed support.

* * * * *